(12) United States Patent
Sahashi

(10) Patent No.: US 9,321,418 B2
(45) Date of Patent: Apr. 26, 2016

(54) VEHICLE SEAT

(71) Applicant: TOYOTA BOSHOKU KABUSHIKI KAISHA, Aichi-ken (JP)

(72) Inventor: Hideo Sahashi, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 14/307,899

(22) Filed: Jun. 18, 2014

(65) Prior Publication Data

US 2014/0375028 A1    Dec. 25, 2014

(30) Foreign Application Priority Data

Jun. 20, 2013   (JP) ................. 2013-129142

(51) Int. Cl.
*B60R 21/207* (2006.01)

(52) U.S. Cl.
CPC ....... *B60R 21/207* (2013.01); *B60R 2021/2076* (2013.01)

(58) Field of Classification Search
CPC ............... B60R 21/201; B60R 21/207; B60R 2021/2076
USPC .................... 280/728.2, 730.1, 730.2
See application file for complete search history.

(56) References Cited

U.S. PATENT DOCUMENTS

| | | | |
|---|---|---|---|
| 5,988,674 A * | 11/1999 | Kimura et al. | 280/730.2 |
| 7,393,005 B2 * | 7/2008 | Inazu et al. | 280/730.2 |
| 7,677,594 B2 * | 3/2010 | Hazlewood et al. | 280/728.2 |
| 7,950,689 B2 * | 5/2011 | Kim et al. | 280/730.2 |
| 2006/0163850 A1 | 7/2006 | Inazu et al. | |
| 2007/0145727 A1 * | 6/2007 | Inoue et al. | 280/730.2 |
| 2009/0001783 A1 | 1/2009 | Hazlewood et al. | |
| 2010/0140905 A1 * | 6/2010 | Kim et al. | 280/730.2 |
| 2012/0068442 A1 | 3/2012 | Wagner | |

FOREIGN PATENT DOCUMENTS

| | | |
|---|---|---|
| CN | 101746303 A | 6/2010 |
| CN | 1990309 B | 5/2011 |
| DE | 10 2010 045 969 | 3/2012 |
| JP | 2006-205765 | 8/2006 |
| JP | 4084853 | 2/2008 |

OTHER PUBLICATIONS

Chinese Office Action, mailed Dec. 31, 2015 with respect to Chinese Patent Application No. 201410279751.1, along with an English translation thereof.

* cited by examiner

*Primary Examiner* — Paul N Dickson
*Assistant Examiner* — Timothy Wilhelm
(74) *Attorney, Agent, or Firm* — Greenblum & Bernstein, P.L.C.

(57) ABSTRACT

A seam of a seat front part is joined to a clip inside a groove on a surface of a seat pad, and tucked into the groove. In a vehicle seat having an airbag unit, inside the seat corresponding to a seam of a seat side part, a webbing is provided along a side part in an area corresponding to the airbag unit on an inner side of the side part. The webbing is sewn together with a seat cover at the seam of the seat side part, and is joined to a non-woven fabric between a seam and the clip in the seat front part on the seam side.

9 Claims, 7 Drawing Sheets

VEHICLE SEAT

INCORPORATION BY REFERENCE

The disclosure of Japanese Patent Application No. 2013-129142 filed on Jun. 20, 2013 including the specification, drawings and abstract is incorporated herein by reference in its entirety.

BACKGROUND OF THE INVENTION

1. Field of the Invention

The invention relates to a vehicle seat having a side airbag.

2. Description of Related Art

In a side airbag provided in a seat back of a vehicle seat, a webbing is sewn together with a seat cover at a seam in order to transmit expansion energy of the airbag to the seam of the seat cover effectively to break the seam in a short time and deploy the airbag without delay. A distal end of the webbing on an opposite side of the seam is fixed to a back frame. Therefore, it is necessary to extend the distal end of the webbing to a fixing part of the back frame, and a bracket is used to join the distal end of the webbing and the back frame together. When the webbing is extended and the bracket is used as stated above, there is a problem that a structure of the seat back becomes complex. Meanwhile, a technology for fixing the distal end of the webbing to a tucking structure of the seat cover has been developed (see Japanese Patent No. 4084853 below). According to this technology, it is no longer necessary to extend the distal end of the webbing to the back frame, and, at the same time, the bracket is no longer necessary because the distal end of the webbing is sewn together with the seat cover.

SUMMARY OF THE INVENTION

However, according to the technology described in Japanese Patent No. 4084853, the webbing is sewn together with the seat cover that is tucked into the tucking structure (a groove part) through a loop tape of the tucking structure (the groove part). Therefore, when the webbing receives expansion energy of the airbag, the loop tape is stretched, and transmission efficiency of the expansion energy of the air bag by the webbing could be deteriorated. In the invention, in a seat in which a distal end of a webbing is fixed to a tucking structure of a seat cover, by reducing a dimension of a connecting member that connects the distal end of the webbing to a fixing member of the tucking structure as much as possible, an absolute amount of stretching of the connecting member of the tucking structure is restrained when the webbing receives expansion energy of the airbag. Thus, deterioration of transmission efficiency of expansion energy of the airbag by the webbing is restrained.

An aspect of the invention is a vehicle seat in which a seat cover is formed as a main part and a side part are sewn together at a seat front part, and the side part and a frame part are sewn together at a seat side part. A seam of the seat front part is joined to a fixing member inside a groove on a surface of the seat pad, and tucked into the groove. The vehicle seat includes an airbag unit for deploying a side airbag, and the airbag unit is provided inside the seat facing a seam of the seat side part. A webbing with smaller tensile elongation than that of the seat cover is provided along the side part in an area facing the airbag unit on an inner side of the side part, and the webbing is sewn together with the seat cover at the seam of the seat side part, and is joined to the fixing member on the seam side of the seat front part. According to the first aspect, the webbing is joined to the fixing member inside the groove in the seat front part on the seam side. This restrains the problem, which is deterioration of transmission efficiency of the expansion energy of the airbag by the webbing as a member placed between the webbing and the fixing member is stretched when the webbing receives expansion energy of the airbag.

In the first aspect, the seam of the seat front part may be tucked in by the fixing member through a connecting member, and the webbing may be joined to the connecting member between the seam and the fixing member, in the seat front part on the seam side. According to the structure, in the seat front part on the seam side, the webbing is joined to the fixing member inside the groove through the connecting member. However, a position where the webbing is joined to the connecting member is set between the seam and the fixing member. Therefore, when the webbing receives expansion energy of the airbag, a length of the connecting member placed in a transmission path of force from the webbing to the fixing member is a part of an entire length of the connecting member. Thus, an absolute amount of stretching of the connecting member is reduced, thereby restraining the problem, which is deterioration of transmission efficiency of expansion energy of the airbag by the webbing.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
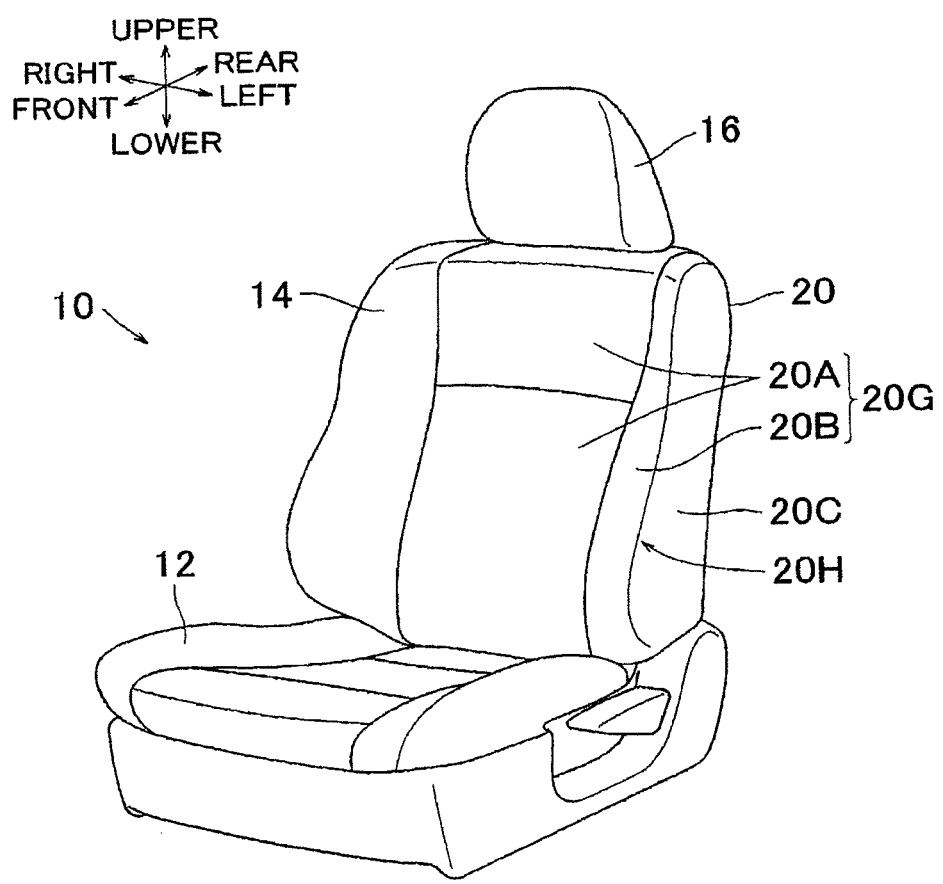
FIG. 1 is a perspective view of a first embodiment of the invention.

FIG. 1 to FIG. 7 show a first embodiment of the invention. The first embodiment shows an example in which the present invention is applied to a side airbag of an automobile front seat. Arrows in the drawings indicate respective directions when the seat is installed in an automobile. In the explanation below, descriptions regarding directions are given based on these directions. An automobile front seat 10 is mainly made of a seat cushion 12 and a seat back 14. The seat back 14 is structured as a back frame 22, that forms a skeleton, is covered by a back pad 18 (working as a seat pad of the invention) made of a soft material, and the back pad 18 is further covered by a seat cover 20 serving as a skin material. A head rest 16 is provided on top of the seat back 14. The above structure is well known.

The seat cover 20 is made as a main part 20A and a side part 2013 are sewn together at a seam 20E of a seat front part 20G, and the side part 20B and a frame part 20C are sewn together at a seam 20F of a seat side part 20H. A back face part 20D, which serves as a back face side of the seat back 14 from the frame part 20C, connects the frame part 20C on the left side of the seat back 14 with a frame part (not shown) on the right side of the seat back 14.

Figure 5:
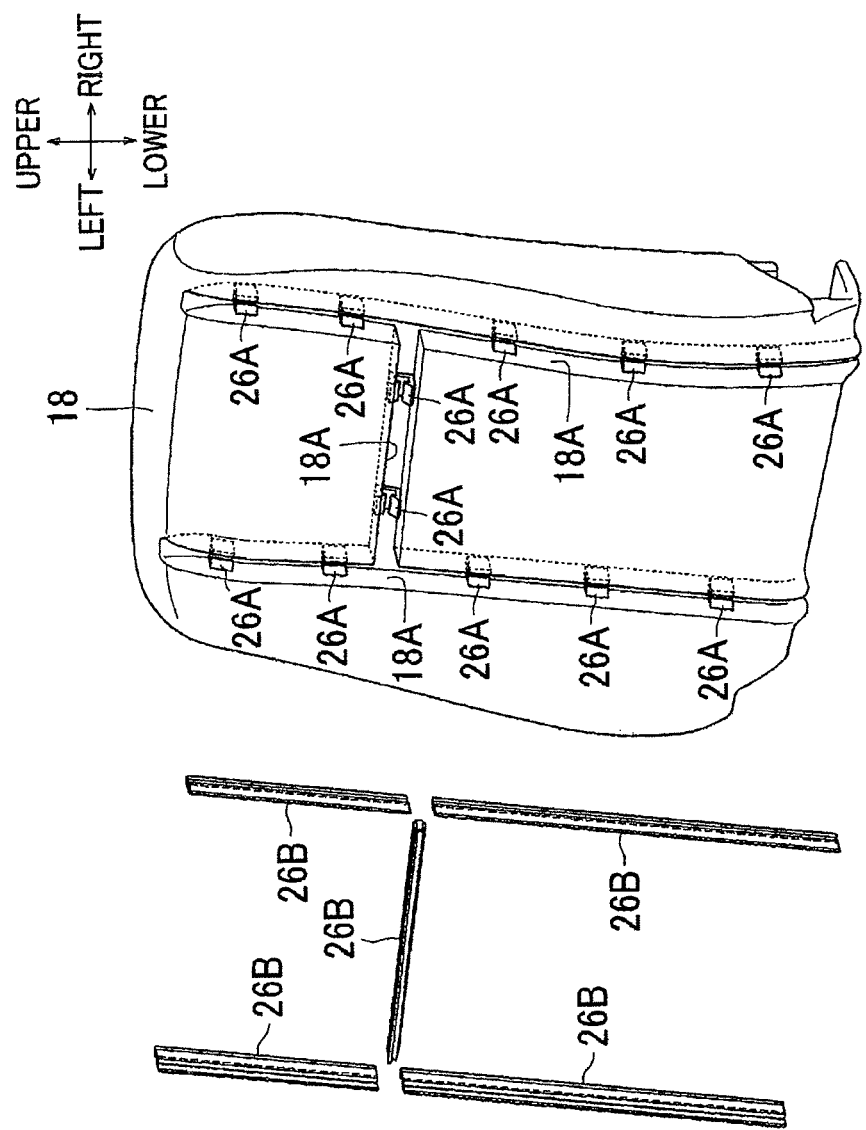
FIG. 5 is a perspective view of a back pad of the first embodiment.
Figure 6:
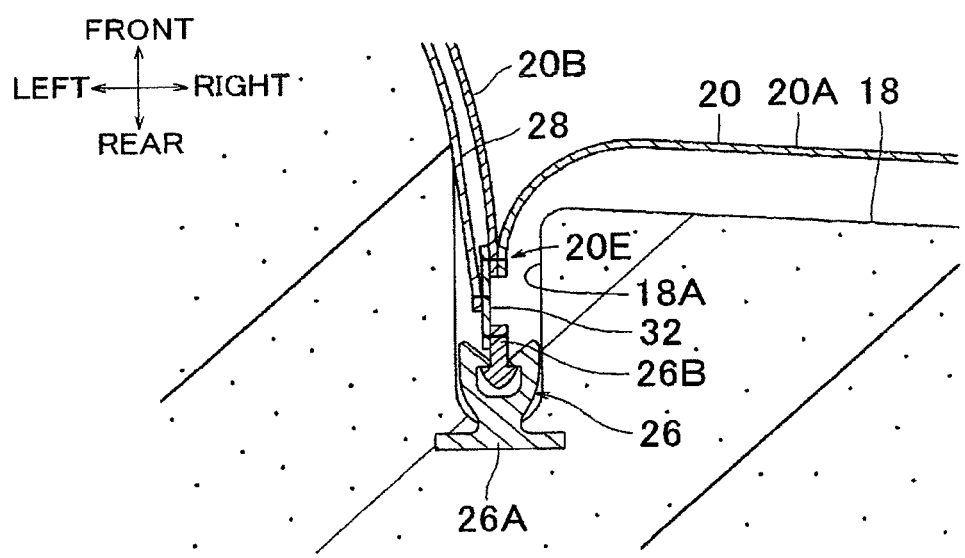
FIG. 6 is an enlarged view of a VI part in FIG. 4.
Figure 7:
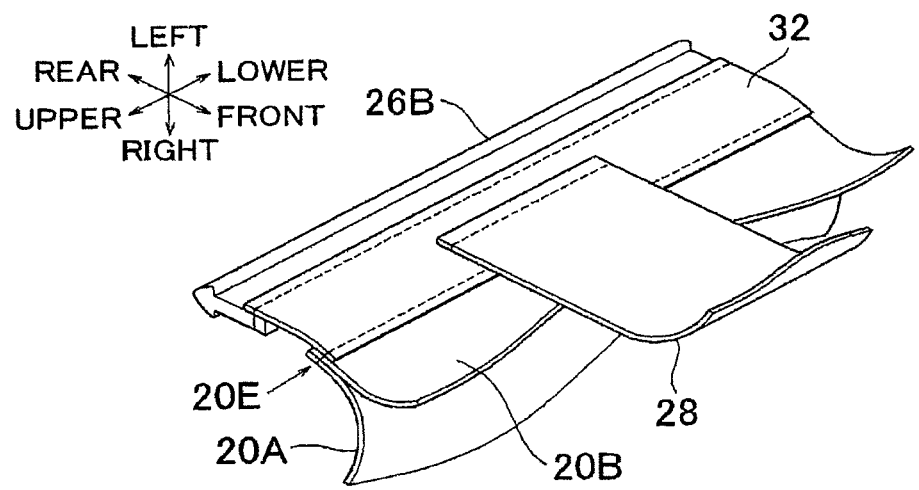
FIG. 7 is an enlarged perspective view of a tucked part of the first embodiment.

The seam 20E of the seat front part 20G is joined to a clip 26 (functioning as a fixing member of the invention) inside a groove 18A on a surface of the back pad 18, and tucked into the groove 18A. As shown in FIG. 5, the groove 18A is formed into an H shape in a front view of the back pad 18, and locking tools 26A of the plurality of clips 26 are partially buried in and thus fixed to a bottom part of the groove 18A at appropriate intervals inside the groove 18A. Hooking tools 26B having an arrowhead-shaped section are engaged with distal ends of the locking tools 26A of the clips 26, so that the seam 20E is fixed to the clips 26. As shown in FIG. 6 and FIG. 7, the seam 20E and the clip 26 are connected with each other through a non-woven fabric 32 (functioning as a connecting member of the invention). In short, one end side of the non-woven fabric 32 is sewn together with the main part 20A and the side part 20B of the seat cover 20 at the seam 20E, and the other end side of the non-woven fabric 32 is sewn together with the hooking tool 26B of the clip 26.

Figure 4:
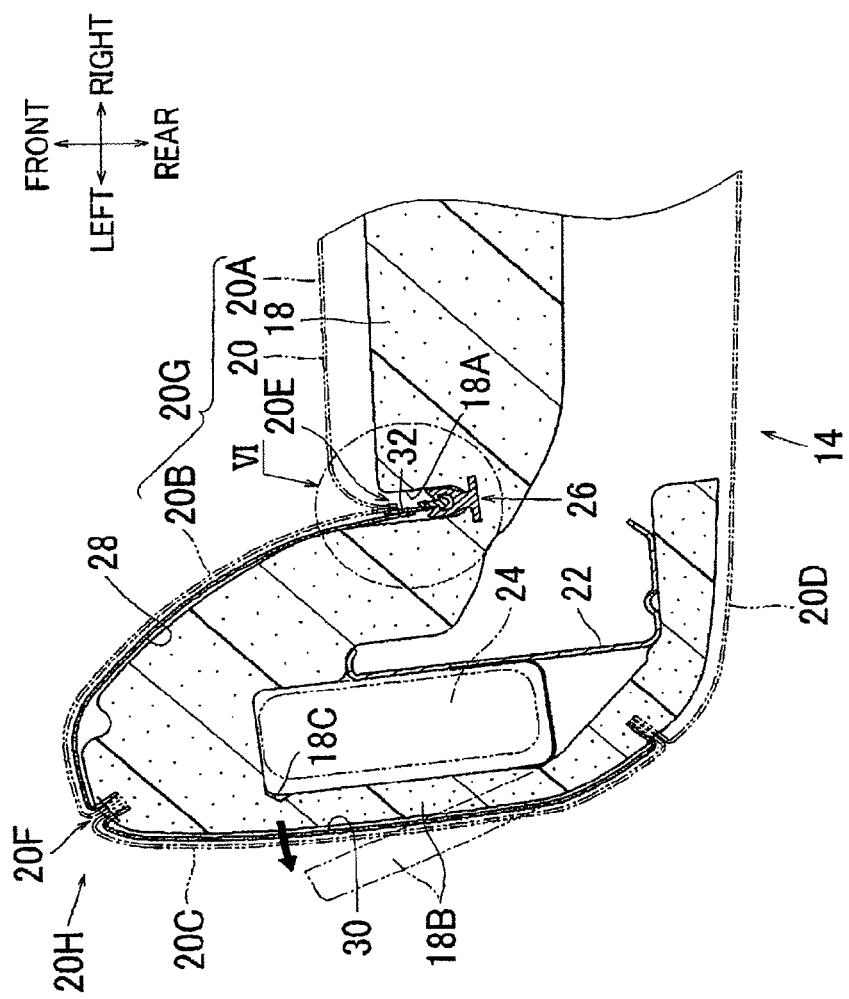
FIG. 4 is a sectional arrow view taken along the line IV-IV in FIG. 2.

As shown in FIG. 4, an airbag unit 24 for deploying a side airbag (not shown) is provided inside the seat that faces the seam 20F of the seat side part 20H. The airbag unit 24 is fixed to the left side of the back frame 22 (an outer side of the automobile front seat 10). In the back pad 18 facing a front-left corner part of the airbag unit 24, a cutout 18C is formed by cutting out the back pad 18. When the airbag expands from the airbag unit 24, the back pad 18 is broken from the cutout 18C so that the airbag is deployed outside from the back pad 18. A reference numeral 18B denotes a deployed part of the back pad 18.

Figure 2:
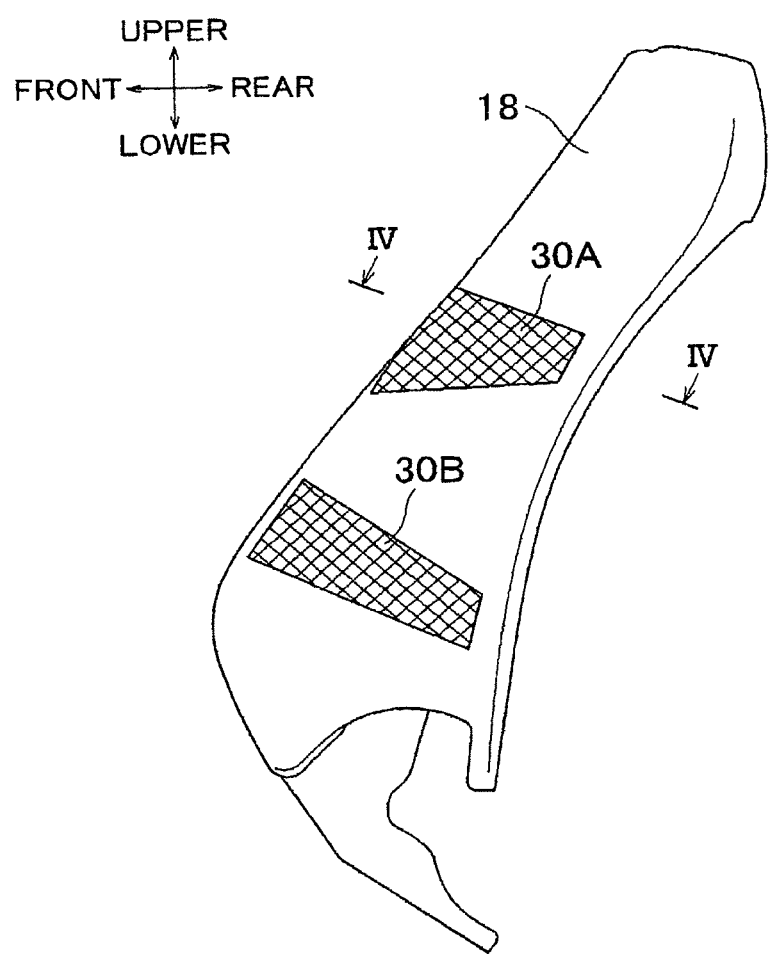
FIG. 2 is a side view of the main part of the first embodiment.
Figure 3:
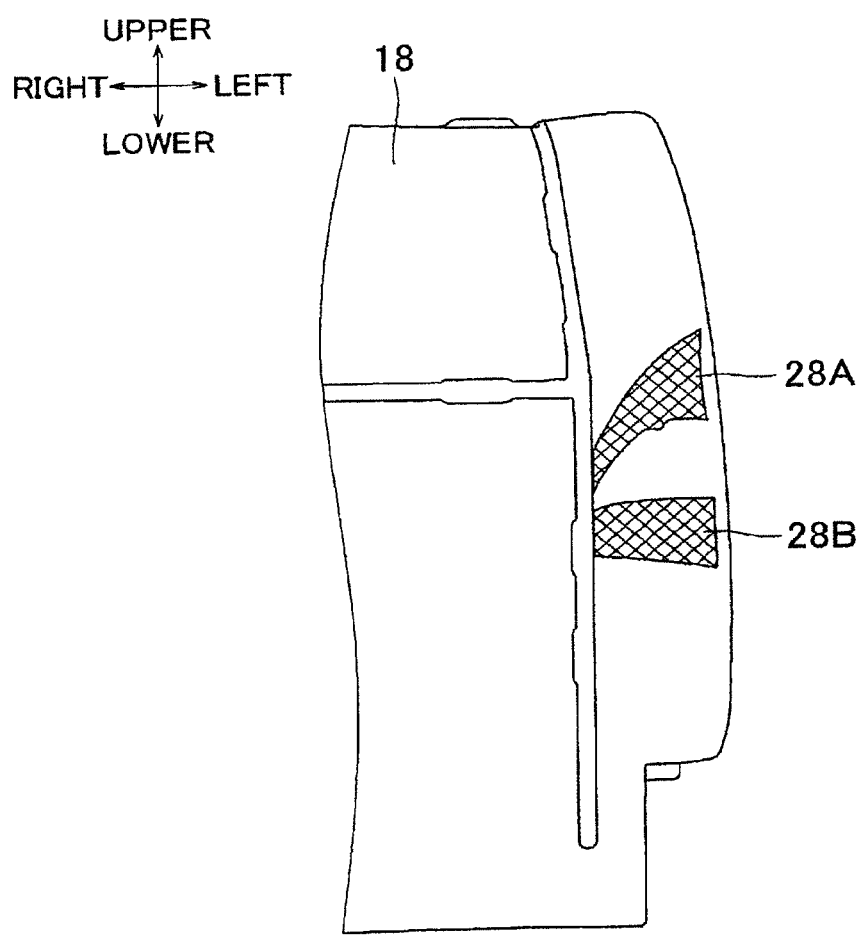
FIG. 3 is a front view of the main part of the first embodiment.

As shown in FIG. 4, in an area facing the airbag unit 24 on an inner side of the side part 20B, a front-side webbing 28, which is made of a material with less tensile elongation than that of the seat cover 20, is provided along the side part 20B. In the case of this embodiment, the front-side webbing 28 is divided vertically into two parts and is made of an upper part of the front-side webbing 28A and a lower part of the front-side webbing 28B as shown in FIG. 3. In an area facing the airbag unit 24 on an inner side of the frame part 20C, a frame-side webbing 30, which is made of a material similar to that of the front-side webbing 28, is provided along the frame part 20C. Similarly to the front-side webbing 28, the frame-side webbing 30 is also divided vertically into two parts, and is made of an upper part of the frame-side webbing 30A and a lower part of the frame-side webbing 30B as shown in FIG. 2. FIG. 2 and FIG. 3 show an appearance of the back pad 18, and the upper part of the front-side webbing 28A, the lower part of the front-side webbing 28B, the upper part of the frame-side webbing 30A, and the lower part of the frame-side webbing 30B with masking in the drawings show a positional relation with the back pad 18.

One end of the front-side webbing 28 is sewn together with the side part 20B of the seat cover 20 at the seam 20F of the seat side part 20H. The other end of the front-side webbing 28 (the seat front part 20G on the seam 20E side) is sewn together with and joined to the non-woven fabric 32. At this time, as shown in FIG. 6, a position where the front-side webbing 28 is sewn together with the non-woven fabric 32 is between the seam 20E and the hooking tool 26B. The frame-side webbing 30 is sewn together with the frame part 20C of the seat cover 20 at the seam 20F of the seat side part 20H, and is also sewn together with the frame part 20C and the back face part 20D of the seat cover 20 on the opposite side.

Due to the above-mentioned structure, when the airbag is expanded by the airbag unit 24, expansion energy of the airbag is transmitted to the front-side webbing 28 and the frame-side webbing 30 through the back pad 18. Once the front-side webbing 28 and the frame-side webbing 30 receive expansion energy of the airbag, expansion energy of the airbag concentrates in a sewing thread of the seam 20F, and the sewing thread is cut off. Hence, the side part 20B and the frame part 20C of the seat cover 20 are separated from each other at the seam 20F, and the back pad 18 is broken at the cutout 18C, so that the deployed part 18B is deployed as shown by an arrow from a solid line position to a broken line position in FIG. 4. When the front-side webbing 28 and the frame-side webbing 30 receive expansion energy of the airbag, the expansion energy is received by the clip 26 through the non-woven fabric 32 in the front-side webbing 28 on the seam 20E side. At this time, a position where the front-side webbing 28 is joined to the non-woven fabric 32 is set between the seam 20E and the clip 26. Therefore, a length of the non-woven fabric 32 placed in a transmission path of force from the front-side webbing 28 to the clip 26 is shorter than an entire length of the non-woven fabric 32. Hence, an absolute amount of stretching of the non-woven fabric 32 is reduced, thereby restraining a problem of deterioration of transmission efficiency of expansion energy of the airbag to the seam 20F by the front-side webbing 28. Further, in the frame-side webbing 30 on the back face part 20D side, expansion energy of the airbag is received by the frame part (not shown) of the seat cover 20 on the opposite side (the right side) through the back face part 20D.

Figure 8:
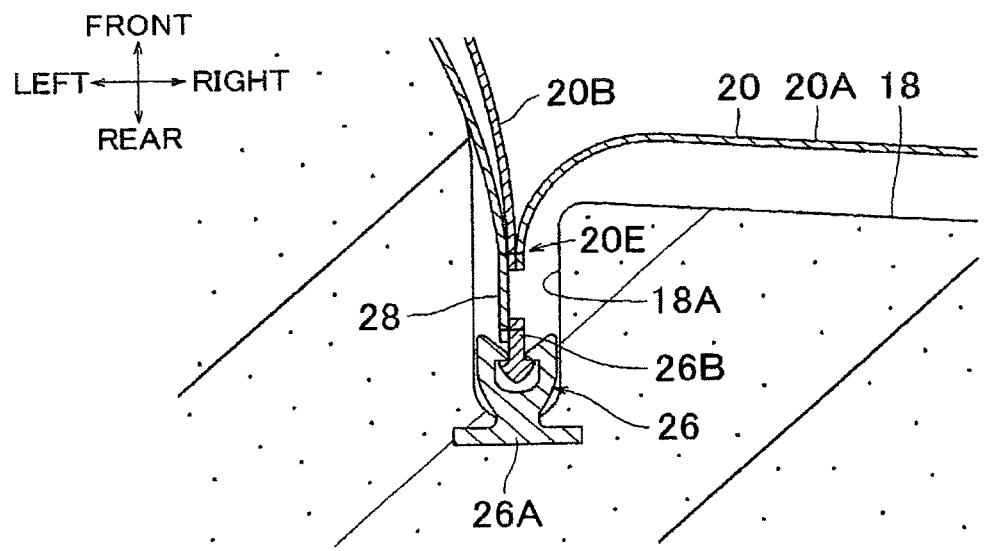
FIG. 8 is a view of a second embodiment according to the invention, corresponding to FIG. 6.

FIG. 8 shows a second embodiment of the invention. A characteristic of the second embodiment contrary to the first embodiment is that a way to fix a front-side webbing 28 to a clip 26 is changed. The rest is the same in both embodiments, so the same reference numerals are used for the same parts, and explanation and illustration thereof are omitted to avoid duplication. In the second embodiment, the front-side webbing 28 is directly joined to a hooking tool 26B of the clip 26. In short, the non-woven fabric 32 provided in the first embodiment is omitted. Therefore, a seam 20E of a main part 20A and a side part 20B of a seat cover 20 is sewn to the front-side webbing 28. According to the second embodiment, expansion energy of an airbag received by the front-side webbing 28 is directly transmitted to and received by the hooking tool 26B of the clip 26. Therefore, it is possible to restrain a problem that the non-woven fabric 32 connecting the front-side webbing 28 with the hooking tool 26B is stretched as in the first embodiment.

Figure 9:
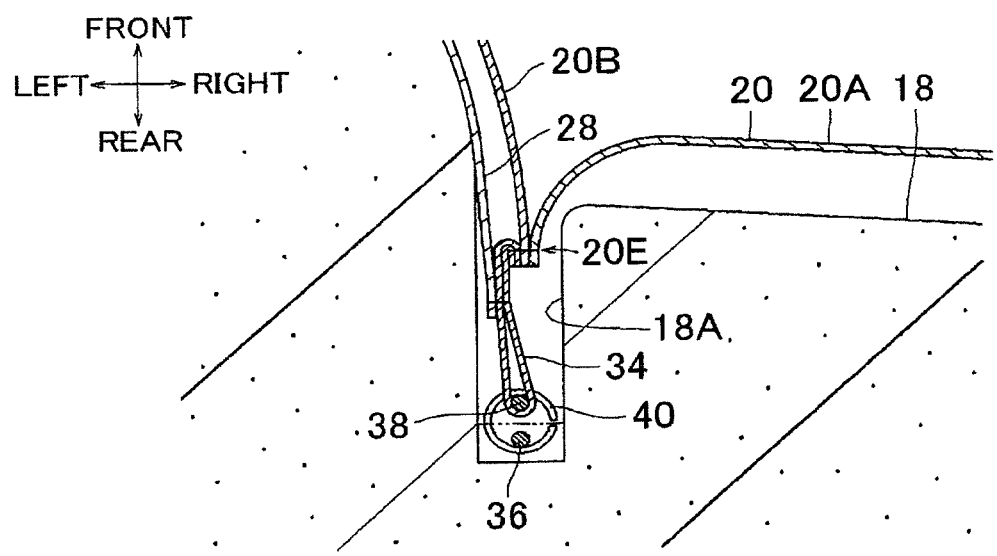
FIG. 9 is a view of a third embodiment according to the invention, corresponding to FIG. 6.

FIG. 9 shows a third embodiment of the invention. A characteristic of the third embodiment contrary to the first embodiment is that a fixing member for fixing a seam 20E of a main part 20A and a side part 20B of a seat cover 20 to a back pad 18 is changed. The rest is the same in both embodiments, so the same reference numerals are used for the same parts, and explanation and illustration thereof are omitted to avoid duplication. In the third embodiment, a pad-side wire 36 is provided in a buried fashion in a bottom part of a groove 18A of the back pad 18, and a circular cotton cloth 34 is sewn to the seam 20E. A cover-side wire 38 is inserted and held in the other end of the cotton cloth 34. The seam 20E is tucked into the groove 18A so that the pad-side wire 36 and the cover-side wire 38 are brought closer to each other, and the pad-side wire 36 and the cover-side wire 38 are joined by a C ring 40. The front-side webbing 28 is sewn and joined to a center part of the cotton cloth 34, or between the seam 20E and the cover-side wire 38. According to the third embodiment, the fixing member is changed from the clip 26 of the first embodiment to a fixing member that joins the pad-side wire 36 and the cover-side wire 38 by using the C ring 40, but the same operation effects as those of the first embodiment are achieved.

Specific embodiments have been explained so far. However, the invention is not limited to the appearance and structures of these embodiments, and various changes, additions, and deletions may be made without departing from the gist of the invention. For example, (1) in the above embodiment, although the frame-side webbing 30 is provided on the inner side of the frame part 20C of the seat cover 20, the frame-side webbing 30 may not be provided; (2) The non-woven fabric 32 according to the first embodiment may be formed by a woven fabric or a resin plate; (3) In the above embodiment, the front-side webbing 28 on the seam 20E side is sewn only to the non-woven fabric 32, but may also be sewn simultaneously with the seam 20E by using the same thread or a different thread; (4) In the above embodiment, the invention is applied to the seat back side, but may also be applied to a seat cushion side; (5) In the above embodiment, the invention is applied to an automobile front seat, but may also be applied to an automobile rear seat, or a seat of a vehicle such as a bus and a train.

What is claimed is:

1. A vehicle seat comprising:
   a seat pad,
   a seat cover including a main part and a side part that are sewn together at a seat front part, and the side part and a frame part are sewn together at a seat side part, in which a seam of the seat front part is joined to a fixing member fixed inside a groove on a surface of the seat pad, and tucked into the groove; and
   an airbag unit for deploying a side airbag that is provided inside the seat facing a seam of the seat side part,
   wherein:
   a webbing comprising a cloth member with smaller tensile elongation than a tensile elongation of the seat cover, is provided along the side part in an area facing the airbag unit on an inner side of the side part; and
   one end of the webbing is sewn together with the seat cover at the seam of the seat side part, and the other end of the webbing is joined to a member connectable with the fixing member through a connector, ends of the side part and the main part of the seat cover being attached to the connector, first and second ends of the connector defining an extent of the connector between the member connected to the fixing member and the main part of the seat cover, and the webbing is connected to the connector intermediate the connections of the fixing member and main seat to the connector.

2. The vehicle seat according to claim 1, wherein the seam of the seat front part is tucked into the groove by the fixing member through the connector, and the other end of the webbing is joined to the connector between the seam and the fixing member.

3. The vehicle seat according to claim 1, wherein one end of the connector is secured to the main part of the seat cover and to the side part of the seat cover and an other end of the connector is joined to the fixing member.

4. The vehicle seat according to claim 1, wherein the webbing is connected to the connector between a connection of the seat side part to the connector and the connection of the fixing member to the connector.

5. The vehicle seat according to claim 1, the fixing member comprising a clip.

6. The vehicle seat according to claim 5, the clip being configured to engage with a locking member positioned at a bottom of the groove.

7. The vehicle seat according to claim 1, the webbing comprises an upper part webbing member and a lower part webbing member.

8. The vehicle seat according to claim 1, a portion of the connector in a transmission path of force from the webbing to the fixing member has an extent less than an extent of the connector.

9. The vehicle seat according to claim 1, the connector comprising a non-woven fabric.

\* \* \* \* \*